United States Patent

Sakamoto et al.

[11] Patent Number: 5,357,816
[45] Date of Patent: Oct. 25, 1994

[54] SHOCK DETECTING DEVICE

[75] Inventors: Kazunori Sakamoto, Chiryu; Masanobu Ishikawa, Nagoya; Yutaka Kondoh, Toyota, all of Japan

[73] Assignee: Aisin Seiki Kabushiki Kaisha, Kariya, Japan

[21] Appl. No.: 14,248

[22] Filed: Feb. 5, 1993

[30] Foreign Application Priority Data

Feb. 7, 1992 [JP] Japan ................. 4-022565

[51] Int. Cl.⁵ .............................................. G05G 17/00
[52] U.S. Cl. ........................................ 74/2; 102/252; 180/282; 280/734
[58] Field of Search ............. 74/2; 102/252; 180/282; 280/734, 737; 137/45; 200/61.48, 61.5

[56] References Cited

U.S. PATENT DOCUMENTS

| | | | |
|---|---|---|---|
| 3,749,282 | 7/1973 | Day et al. ................ | 280/734 X |
| 4,889,068 | 12/1989 | Tabata et al. ............ | 116/203 |
| 5,142,922 | 9/1992 | Sakamoto et al. ......... | 74/2 |
| 5,193,407 | 3/1993 | Sakamoto et al. ......... | 74/2 |

FOREIGN PATENT DOCUMENTS

452521 10/1991 European Pat. Off. ............ 280/734
2559584 8/1985 France .
2-249744 10/1990 Japan .

*Primary Examiner*—Allan D. Herrmann
*Attorney, Agent, or Firm*—Burns, Doane, Swecker & Mathis

[57] ABSTRACT

An impact sensing apparatus includes a housing having a wall portion which is parallel with the applied direction of an outside shock and a hole which is formed in the wall portion, a weight disposed in the housing and moved by an outside shock which is more than a predetermined value, an output member rotatably disposed in the housing and rotated in response to the movement of the weight and an urging member interposed between the housing and the output member for urging the output member so as to project from the hole. According to this improved impact sensing apparatus, it is possible to lengthen the stroke of the rotational motion of the output member and therefore it is possible to effectively utilize the urging force of the urging member as a kinetic energy of the output member. Thus, it is possible to improve the reliability for igniting the ignition element such as a primer due to a striking operation of the output member.

3 Claims, 7 Drawing Sheets

SHOCK DETECTING DEVICE

BACKGROUND OF THE INVENTION

1. Field of the Invention

The present invention relates to an impact sensing apparatus, and more particularly to an impact sensing apparatus which mechanically ignites an ignition element without electric power for use as a starting sensor of an anti-shock safety system such as an air-bag and a seatbelt tensioner.

2. Description of the Prior Art

A conventional impact sensing apparatus is disclosed, for example, in Japanese patent application laid-open publication No. 2 (1990)-249744. In this prior impact sensing apparatus, when a shock which is more than a predetermined value is applied from outside thereto, a weight is rotated and slid by the shock. Then, the engagement between a cam portion formed on the weight and a firing lever is released by the rotation and the sliding movement of the weight and the firing lever is rotated by the urging force of a spring. As a result, a firing pin formed on the firing lever projects outside of the housing in the opposite direction with respect to the applied direction of the shock through a hole portion which is formed on the right-angled wall of the housing. Then, the firing pin strikes an ignition element such as a primer. In the above conventional impact sensing apparatus, however, since the firing pin projects outside of the housing in the opposite direction with respect to the applied direction of the shock through the hole portion which is formed on the fight-angled wall of the housing, the stroke of the rotational motion of the firing lever is short. Therefore, it is not able to effectively utilize the urging force of the spring as a kinetic energy of the firing pin for striking the ignition element.

SUMMARY OF THE INVENTION

It is, therefore, an object of the present invention to provide an improved impact sensing apparatus which overcomes the above drawbacks.

It is another object of the present invention to provide an improved impact sensing apparatus which can effectively utilize the urging force of the urging means such as the spring as a kinetic energy of an output member such as the firing pin for striking the ignition element.

In order to achieve these objects, there is provided an impact sensing apparatus which includes a housing having a wall portion which is parallel with the applied direction of an outside shock and a hole portion which is formed on the wall portion, a weight disposed in the housing and moved by an outside shock which is more than a predetermined value. An output member rotatably disposed in the housing and rotated in response to the movement of the weight and an urging means interposed between the housing and the output member and urging the output member so as to project from the hole portion.

According to the above improved impact sensing apparatus, when an outside shock which is more than a predetermined value is applied to the device and the weight is moved, the output member projects outside of the housing in the substantially fight-angled direction with respect to the applied direction of the shock through the hole portion. Thus, it is possible to lengthen the stroke of the rotational motion of the output member and therefore it is possible to effectively utilize the urging force of the urging means as a kinetic energy of the output member for striking the ignition element.

BRIEF DESCRIPTION OF THE DRAWINGS

Additional objects and advantages of the present invention will become more apparent from the following detailed description of preferred embodiments when considered with reference to the attached drawings, in which.

DESCRIPTION OF THE PREFERRED EMBODIMENTS

An impact sensing apparatus constructed in accordance with embodiments of the present invention will be described with reference to the attached drawings.

Figure 1:
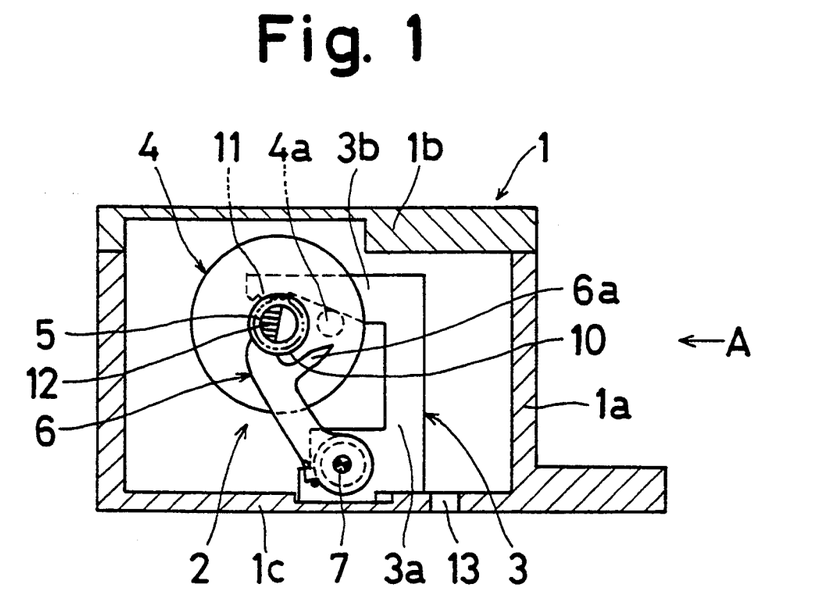
FIG. 1 is a sectional view of a first embodiment of an impact sensing apparatus in accordance with the present invention.
Figure 2:
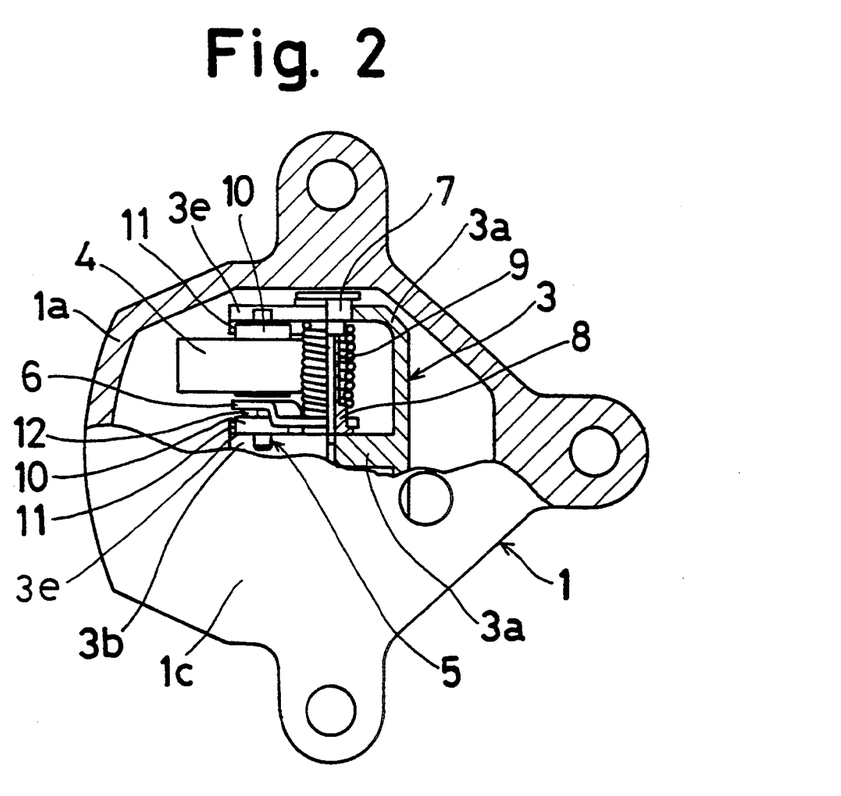
FIG. 2 is a plan view of a first embodiment of an impact sensing apparatus in accordance with the present invention.

FIG. 1 to FIG. 6 show a first embodiment of the present invention. As shown in FIG. 1 and FIG. 2, a housing 1 is comprised of a cup-shaped member 1a and a cover member 1b. In an inner space of the housing 1 which is defined by the cup-shaped member 1a and the cover member 1b, a shock detecting mechanism 2 is disposed therein.

Figure 3:
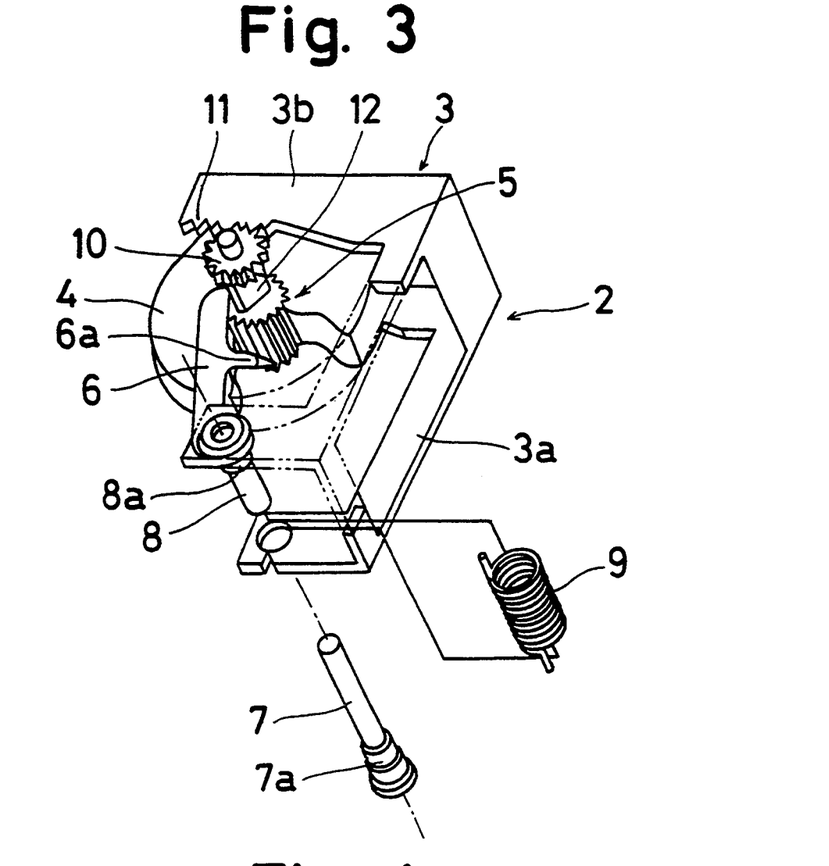
FIG. 3 is a perspective view of a first embodiment of an impact sensing apparatus in accordance with the present invention.

Referring to FIG. 1 to FIG. 3, a frame 3 is fixed to the approximate center portion of a wall 1c of the cup-shaped member 1a which is parallel with the applied direction of the shock (A direction in FIG. 1). The frame 3 is formed by bending a sheet member and includes a pair of L-shaped supporting members 3a which are opposite each other and a pair of flange portions 3b which extend perpendicularly from a top end of the supporting portions 3a and which are opposite each other. The frame 3 is fixed to the wall 1c at the supporting portions 3a.

A weight 4 is movably supported in the housing 1 through a shaft 5 which is moved with the weight 4 in a body. The weight 4 has a disc-shape which centers the shaft 5 and which has a large diameter. A stopper pin 4a which contacts the flange portion 3b of the frame 3 is formed on the weight 4 and the weight 4 is held at its initial position in the housing 1 by the contact between the flange portion 3b and the stopper pin 4a. It is to be noted that both ends of the shaft 5 are in sliding engagement with grooves 3e which are formed in the flange portion 3b. Thus, the weight 4 is movable along grooves 3e and is rotatable relative to the bracket 3.

Figure 4:
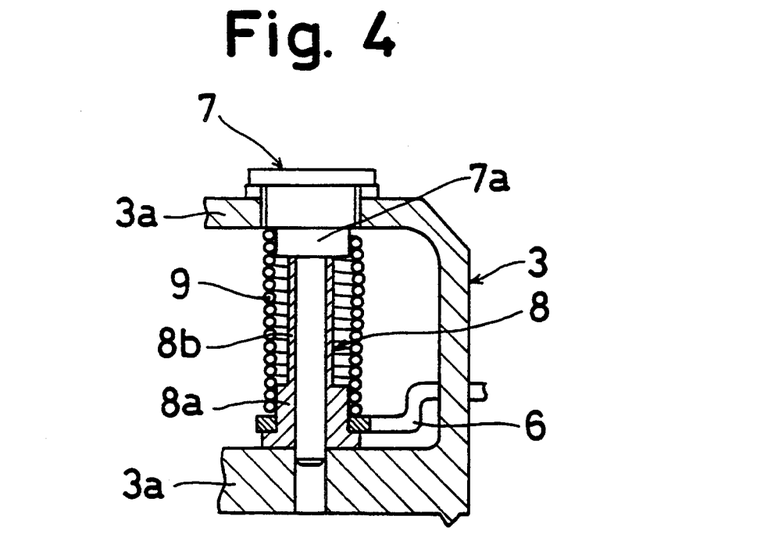
FIG. 4 is a sectional view showing the surroundings of a pin of a first embodiment of an impact sensing apparatus in accordance with the present invention.

A firing lever 6 is rotatably supported between the supporting portions 3a of the frame 3 by a pin 7 through a collar 8. As shown in FIG. 4, a torsion spring 9 which is engaged with the supporting portion 3a of the frame 3 at its one end and which is engaged with the firing lever 6 at its other end is disposed around the collar 8. Thus, the firing lever 6 is normally urged clockwise in FIG. 1. As shown in FIG. 3 and FIG. 4, the pin 7 and the collar 8 are provided with stepped portions 7a and 8a, respectively. The stepped portion 7a supports the one end side of the winding portion of the torsion spring 9 and the stepped portion 8a supports the other end side of the winding portion of the torsion spring 9 as well as the firing lever 6. A diameter of a main body portion 8b of the collar 8 is smaller than that of the stepped portion 8a so that a predetermined clearance is formed between the main body port/on 8b and the winding portion of the torsion spring 8. As shown in FIG. 1 and FIG. 2, a firing pin 6a is formed on the firing lever 6 so as to be capable of projecting from a hole portion 13 formed on the wall 1c by the rotation of the firing lever 6. The firing lever 6 and the firing pin 6a correspond to an output member of the present invention and the torsion spring 9 corresponds to an urging means of the present invention.

As shown in FIG. 1 and FIG. 3, a pinion gear 10 is fixed to the shaft 5, and a rack gear 11 which is engaged with the pinion gear 10 is formed on the flange portions 3b of the frame 3. The pinion gear 10 and the rack gear 11 correspond to a guide means of the present invention. A semicircle-shaped cam portion 12 is formed on the shaft 5 and is engageable with the firing lever 6 so as to be capable of being released therefrom.

Each of the above parts is assembled as follows. At first, the pinion gear 10 is engaged with the rack gear 11 under an initial condition in which the weight 4 is supported on the shaft and in which the stopper pin 4a is in contact with the flange portion 3b. Next, the firing lever 6 is supported on the frame 3 by the pin 7 through the torsion spring 9 and the cam portion 12 is engaged with the firing lever 6. Thus, the weight 4 and the firing lever 6 are supported on the frame 3 and are united. Then, the frame 3 on which all parts 4, 6, 10 and 11 are supported is fixed to the housing 1 in another manufacturing process and thereby the shock detecting mechanism 2 is disposed in the housing 1.

As mentioned above, the firing lever 6, the pinion gear 10, the rack gear 11 and the weight 4 are supported on the frame 3 and are separately united from the housing 1. Accordingly, it is possible to assemble all parts during a manufacturing process that is separate from the manufacturing process for assembling the housing 1 and therefore it is possible to improve the assembling performance. Furthermore, since the frame 3 is formed by a sheet member which is able to easily maintain the measuring accuracy, it is difficult to generate the assembling error among each of the parts 4, 6, 10, and 11 and therefore it is possible to reliably maintain a stable performance of the shock detecting device.

Figure 5:
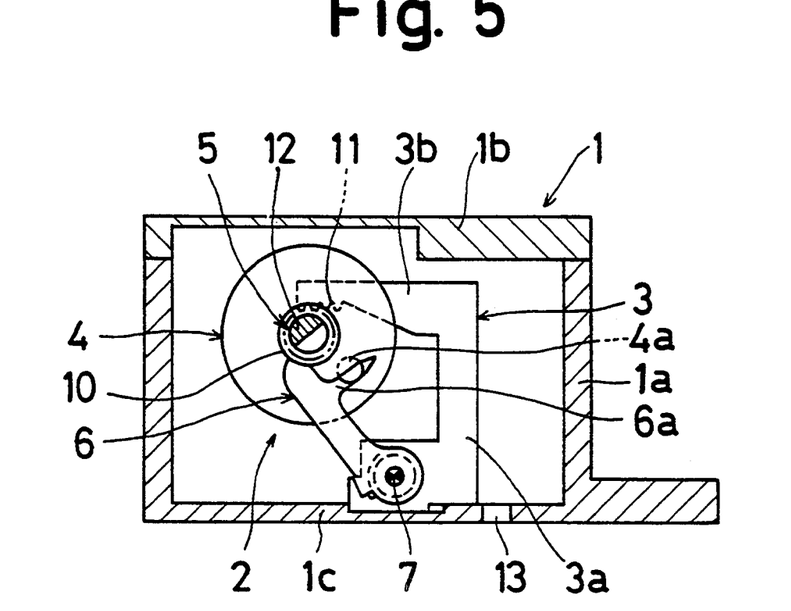
FIG. 5 and FIG. 6 are sectional views showing an operating condition of a first embodiment of an impact sensing apparatus in accordance with the present invention.
Figure 6:
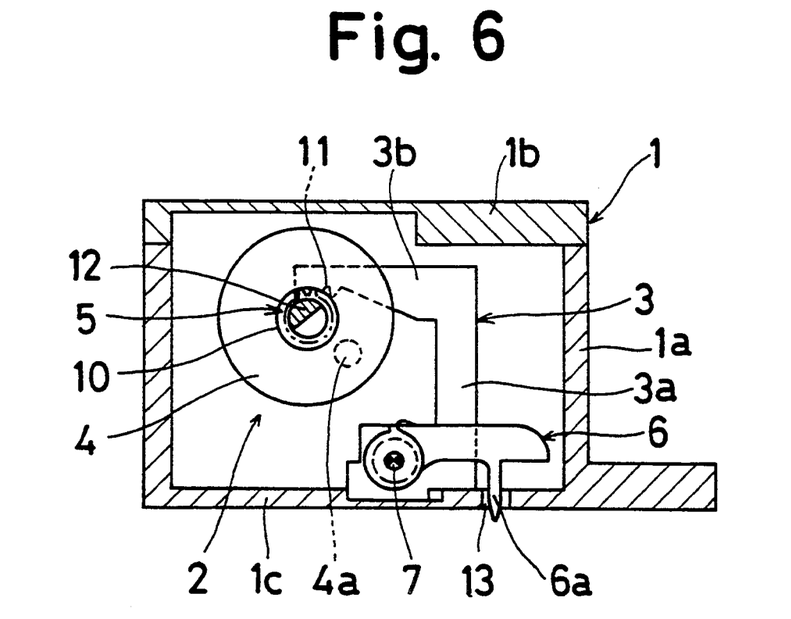

The above-described first embodiment of the impact sensing apparatus operates as follows. FIG. 1 shows the initial condition of the shock detecting device. In this initial condition, the cam portion 12 is engaged with the firing lever 6 and the weight 4 is held in its initial position in which the stopper pin 4a is in contact with the flange portion 3b by the urging force of the torsion spring 9. The firing lever 6 is held in the position shown in FIG. 1 by the engagement with the cam portion 12 against the urging force of the torsion spring 9. In case of a vehicle collision or the like, when the shock is applied from A direction shown in FIG. 1, the weight 4 detects the shock, and is rotated and slides against the urging force of the torsion spring 9 by the inertia force according to the shock. The weight rotates and slides as a result of the engagement between the pinion gear 10 and the rack gear 11 as shown in FIG. 5. As a result, the engagement between the cam portion 12 and the firing lever 6 is released. Thus, as shown in FIG. 6, the firing lever 6 is rotated by the urging force of the torsion spring 9 and then the firing pin 6a is projected from the hole portion 13 and strikes a primer (not shown) which is adjacent to the wall 1c. As mentioned above, the torsion spring 9 has two functions. Namely, the torsion spring 9 keeps the weight 4 at its initial position and urges the firing lever 6 to rotate after the shock is detected. Consequently, it is possible to obtain significant energy for projecting the firing pin 6a with a small disposition space and it is possible to decrease the number of parts. Accordingly, it is possible to miniaturize the shock detecting device. Furthermore, since the weight 4 is disc-shaped so as to center the shaft 5 and since the weight has a large diameter, it is possible to enlarge the moment of inertia of the weight 4. Hence, the momentary shock which is generated while traveling on a rough road and the like is not detected and therefore a misfiring operation can be prevented. Accordingly, it is possible to improve the reliability of the shock detecting device.

As mentioned above, the firing pin 6a projects from the hole portion 13 formed on the wall 1 c which is parallel with the applied direction of the shock (A direction in FIG. 1). That is, the firing pin 6a projects in a direction substantially at a right-angle with respect to the applied direction of the shock (A direction in FIG. 1). Thus, it is possible to lengthen the stroke of the rotational motion of the firing lever 6 and therefore it is possible to effectively utilize the urging force of the torsion spring 9 as a kinetic energy of the firing lever 6 for striking the primer (not shown). As a result, it is possible to maintain a stable and large amount of energy for igniting the ignition element and therefore it is possible to improve the igniting reliability of the ignition element. According to the mounting position or the mounting space of the shock detecting device, a situation may arise in which the primer has to be disposed in substantially right-angled directions with respect to the applied direction of the shock from outside. In such a case, the above-described impact sensing apparatus in accordance with the present invention can be employed without greatly changing the arrangement of the pans and without increasing the number of parts. Furthermore, the torsion spring 9 is supported on the stepped portion 7a of the pin 7 and on the stepped portion 8a of the collar 8 at the end portions of the winding portion. A predetermined clearance is thereby formed between the main body portion 8b of the collar 8 and the winding portion of the torsion spring 9. Thus, since it is possible to reduce the friction loss due to the torsion spring 9, the weight 4 is held in the stable initial condition and it is possible to stabilize to a relatively high degree the shock detecting performance. Furthermore, a loss of the kinetic energy of the firing lever 6 is reduced and therefore it is possible to further improve the reliability of igniting the ignition element and the shock detecting performance.

Figure 7:
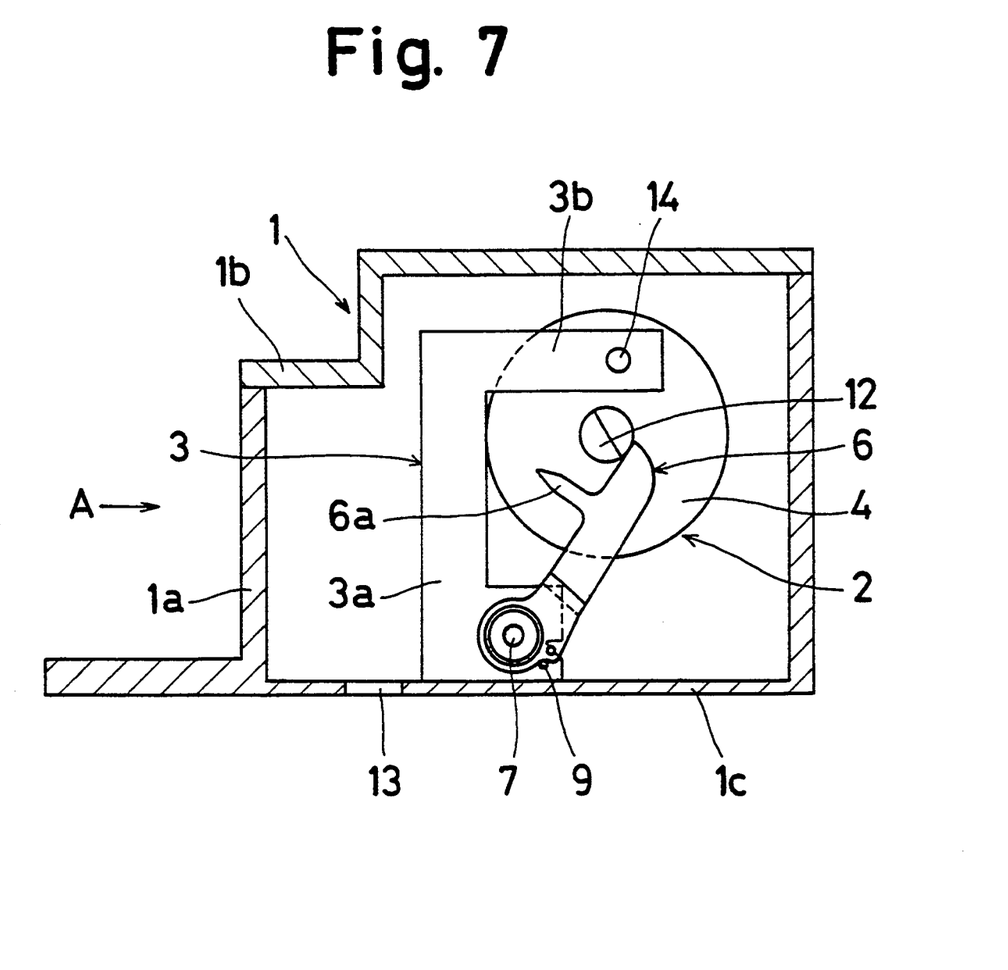
FIG. 7 is a sectional view of a second embodiment of an impact sensing apparatus in accordance with the present invention.
Figure 8:
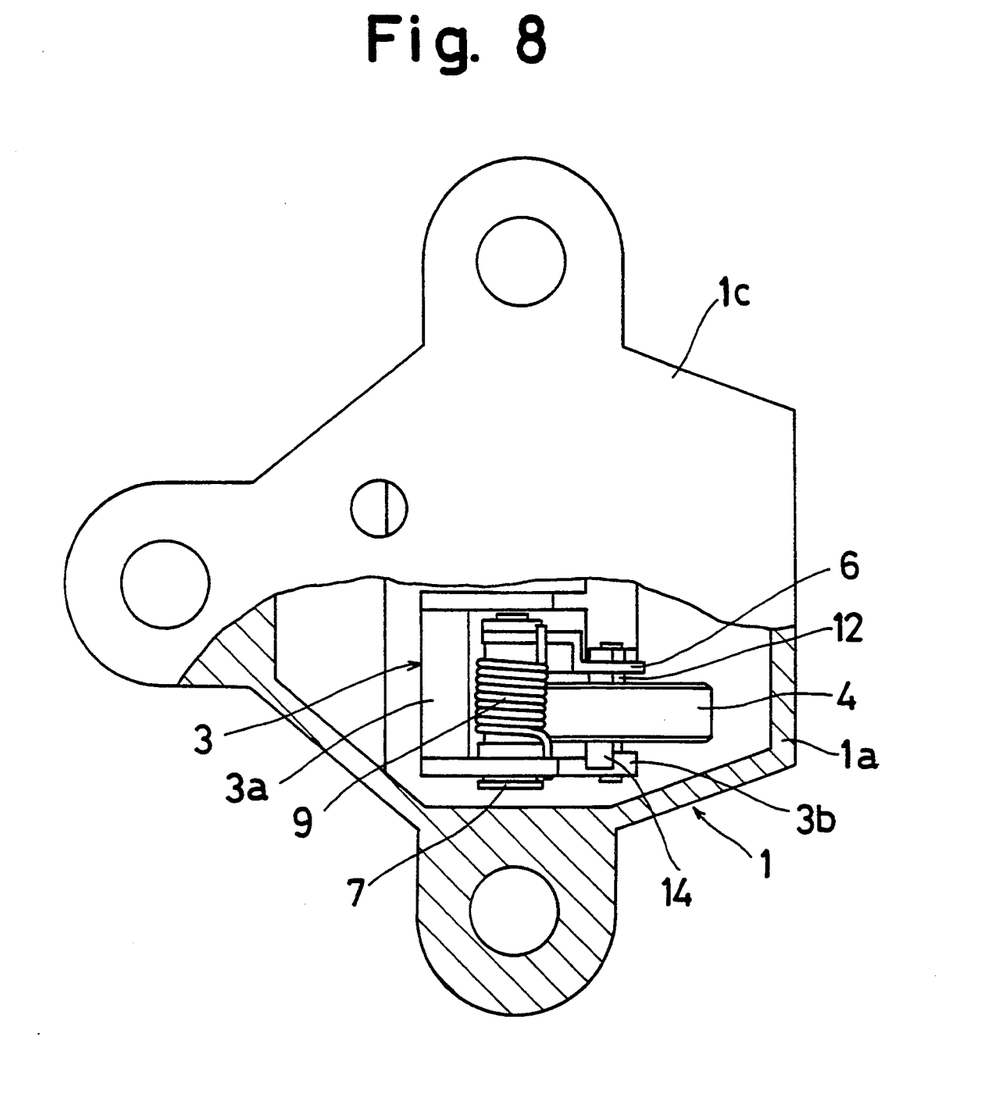
FIG. 8 is a plan view of a second embodiment of an impact sensing apparatus in accordance with the present invention.
Figure 9:
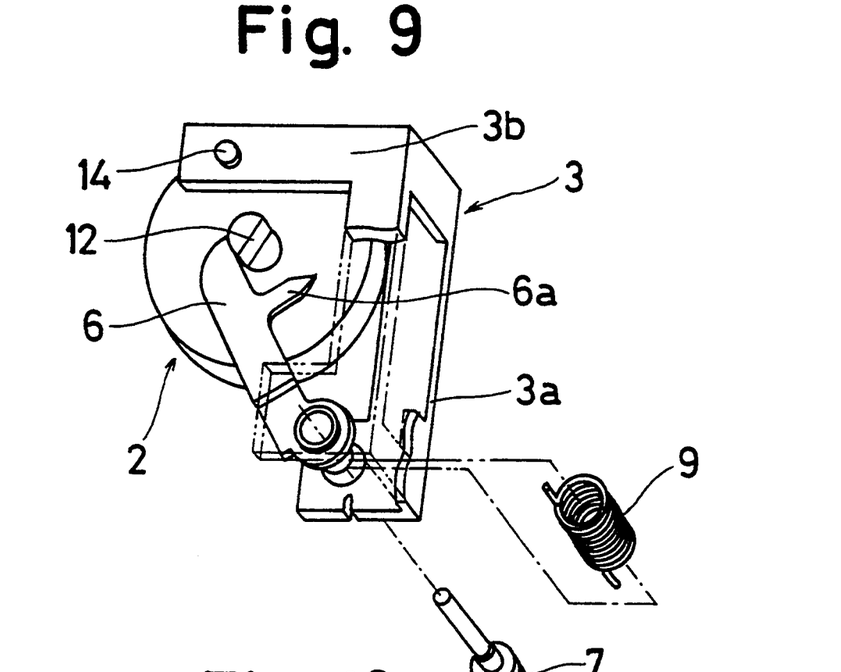
FIG. 9 is a perspective view of a second embodiment of an impact sensing apparatus in accordance with the present invention.

FIG. 7 to FIG. 11 show a second embodiment of the present invention. In FIG. 7 to FIG. 11, the same parts as compared with FIG. 1 to FIG. 6 are identified with the same reference numerals utilized in FIG. 1 to FIG. 6. Referring to FIG. 7 to FIG. 9, a weight 4 having a disc-shaped-form is movably supported on flange portions 3b of a frame 3 by a pin 14 at its eccentric position which is shifted from its center of gravity. In this embodiment, a shock detecting device is not provided with the pinion gear 10 and the rack gear 11 of the first embodiment. Since the other structures are the same as the first embodiment, the description is omitted.

In this embodiment, each of the parts of the impact sensing apparatus is assembled as follows. At first, the weight 4 is supported on the frame 3 by the pin 14. Next, a firing lever 6 is supported on the frame 3 by a pin 7 through a torsion spring 9 and a cam portion 12 is engaged with a firing lever 6. Thus, the weight 4 and the firing lever 6 are supported on the frame 3 and are united. Then, the frame 3 on which all parts are supported is fixed to a housing 1 in a manufacturing process for assembling the housing 1 so that the shock detecting mechanism 2 is disposed in the housing 1.

As mentioned above, the firing lever 6 and the weight 4 are supported on the frame 3 and are separately united from the housing 1. Accordingly, it is possible to assemble all parts during a separate manufacturing process from the manufacturing process for assembling the housing 1 and so it is possible to improve the assembling performance in a manner similar to that in the first embodiment. Furthermore, since the frame 3 is formed by a sheet member which is able to easily maintain the measuring accuracy as in the first embodiment, it is difficult to generate an assembling error among each of the parts and therefore it is possible to surely hold the stable performance of the shock detecting device.

Figure 10:
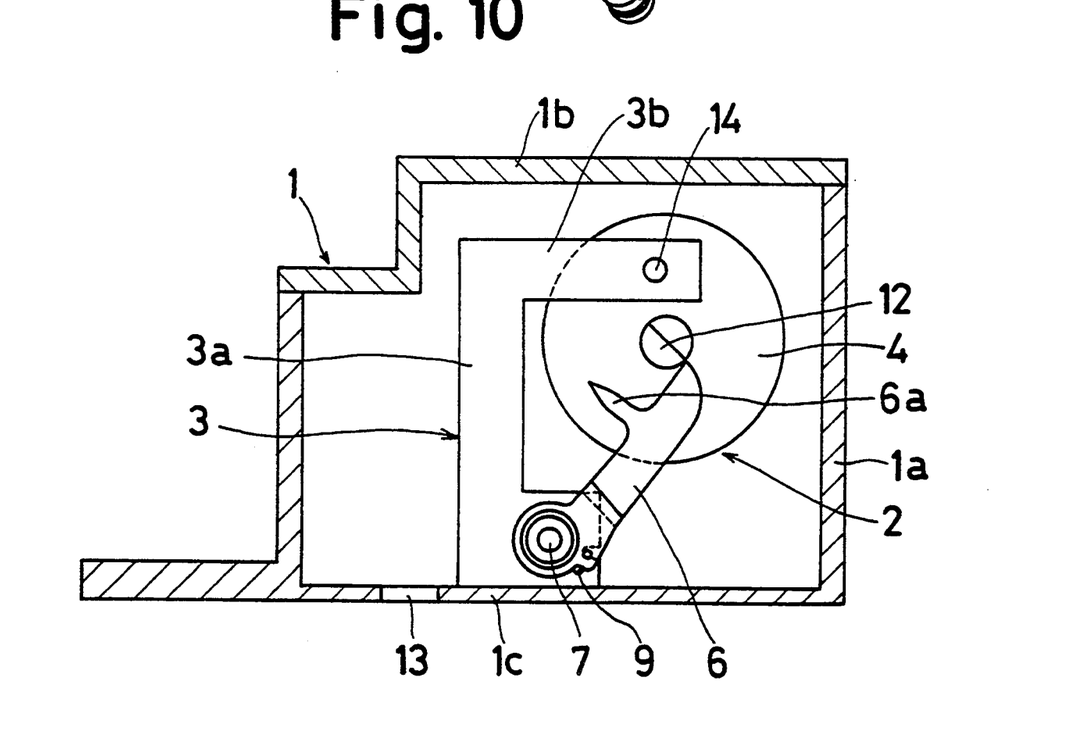
FIG. 10 and FIG. 11 are sectional views showing an operating condition of a second embodiment of an impact sensing apparatus in accordance with the present invention.
Figure 11:
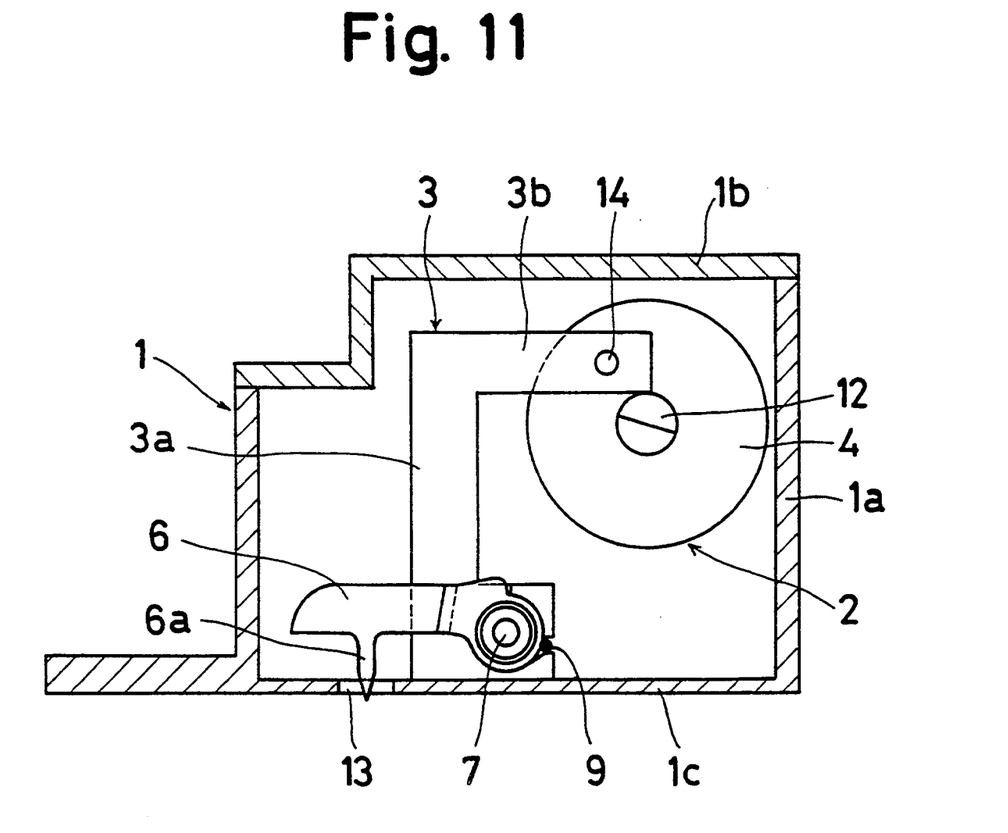

The above-described second embodiment of the impact sensing apparatus operates as follows. In the initial condition shown in FIG. 5, when the shock is applied in the A direction, the weight 4 detects the shock and is rotated about the pin 14 against the urging force of the torsion spring 9 as shown in FIG. 10. Consequently, the cam portion 12 is rotated and slides like in the first embodiment. As a result, the engagement between the cam portion 12 and the firing lever 6 is released as shown in FIG. 11 so that the firing lever 6 is rotated by the urging force of the torsion spring 9. The operation which follows this condition is the same as in the first embodiment and the effects of this embodiment are the same as in the first embodiment, therefore the description is omitted. As mentioned above, in this embodiment, the rotational slide of the cam portion 12 is obtained by the oscillatory motion of the weight 4 (the eccentric motion of the weight 4 about the pin 14). Thus, since it is not necessary to use the pinion gear 10 and the rack gear 11 in accordance with the first embodiment, it is possible to reduce the number of parts and decrease the processing steps.

In the above-described embodiments, in order to further improve the reliability for igniting the ignition element and for detecting a shock, a pair of shock detecting mechanisms 2 is disposed in the housing 1.

According to the present invention, as mentioned above, it is possible to lengthen the stroke of the rotational motion of the output member so as to effectively utilize the urging force of the urging means as a kinetic energy of the output member for striking the ignition element. Thus, it is possible to maintain a stable and large amount of energy for igniting the ignition element and therefore it is possible to improve the reliability for igniting the ignition element.

Furthermore, according to the present invention, it is possible to apply the shock detecting device to a vehicle having a layout which requires that the primer be disposed at about a right-angle direction with respect to the applied direction of the shock from outside due to the mounting position or the mounting space of the shock detecting device without largely changing the arrangement of parts and without increasing the number of parts.

Furthermore, since the spring as the urging means is disposed around the rotational shaft of the output member and is supported on the rotational shaft only at both of its ends, it is possible to reduce the friction loss of the rotational shaft due to the spring and thus it is possible to further improve the reliability for igniting the ignition element and the shock detecting performance.

The principles, preferred embodiments, and modes of operation of the present invention have been described in the foregoing description. The invention which is intended to be protected herein should not, however, be construed as limited to the particular forms disclosed, a these are to be regarded as illustrative rather than restrictive. Variations and changes may be made by those skilled in the art without departing from the spirit of the present invention. Accordingly, the foregoing detailed description should be considered exemplary in nature and not limited to the scope an spirit of the invention as set forth in the append claims.

What is claimed:

1. An impact sensing apparatus comprising:
   a housing having an inner space, a first wall for receiving an impact, and a second wall oriented substantially perpendicular to the first wall; and
   a unitary assembly constructed independent of the housing and positioned within the housing for being secured to the housing, said unitary assembly including a frame having a first portion which extends substantially parallel to the first wall, and a second portion which extends away from the first portion and substantially parallel to the second wall, a weight pivotally mounted on the second portion of the frame to rotate about a pivot axis when an impact is applied to the housing, a cam provided on the weight, a firing lever pivotally mounted on the first portion of the frame for moving rotatably through an angle greater than ninety degrees between one position in which a portion of the firing lever engages the cam and another position in which a portion of the firing lever extends outside the housing through a hole formed in the second wall, and a spring urging the firing lever against the cam.

2. An impact sensing apparatus according to claim 1, wherein the pivot axis about which the weight rotates is displaced from a longitudinal axis of the weight.

3. An impact sensing apparatus according to claim 1, wherein the pivot axis about which the weight rotates is stationarily positioned with respect to the second portion of the frame.

* * * * *